United States Patent [19]
Lohr

[11] Patent Number: 5,607,372
[45] Date of Patent: Mar. 4, 1997

[54] CO-AXIAL DRIVE FOR A TOROIDAL DRIVE TYPE TRANSMISSION

[75] Inventor: Charles B. Lohr, Kettering, Ohio

[73] Assignee: The Torax Company, Inc., Dayton, Ohio

[21] Appl. No.: 372,771

[22] Filed: Jan. 13, 1995

[51] Int. Cl.⁶ ................................................. F16H 37/12
[52] U.S. Cl. ........................................ 475/216; 475/217
[58] Field of Search ................................. 475/214, 215, 475/216, 218

[56] References Cited

U.S. PATENT DOCUMENTS

| | | | |
|---|---|---|---|
| 2,086,491 | 7/1937 | Dodge | 475/216 |
| 2,716,357 | 8/1955 | Rennerfelt | 475/216 |
| 4,464,952 | 8/1984 | Stubbs | 475/216 |
| 4,662,240 | 5/1987 | Greenwood | 74/691 |
| 4,756,211 | 7/1988 | Fellows | 475/214 |
| 4,768,398 | 9/1988 | Greenwood | 475/216 |
| 5,368,529 | 11/1994 | Machida | 476/42 |
| 5,453,061 | 9/1995 | Fellows | 475/215 |

FOREIGN PATENT DOCUMENTS

| | | | |
|---|---|---|---|
| 84724 | 8/1983 | European Pat. Off. | 475/216 |
| 1011692 | 7/1957 | Germany | 475/215 |
| 2136893 | 9/1984 | United Kingdom | 475/216 |

OTHER PUBLICATIONS

"Advanced Automotive Transmission Development Status and Research Needs", The Aerospace Corporation, published Apr. 1982.

*Primary Examiner*—Charles A. Marmor
*Assistant Examiner*—Nathan O. Jensen
*Attorney, Agent, or Firm*—Killworth, Gottman, Hagan & Schaeff

[57] ABSTRACT

A transmission having a power input and output that run along the same axis without having to use parallel shafting. The transmission is of the type which includes a toroidal drive and a co-axial drive, with the co-axial drive having a rotating planetary carrier that bisects the reaction path between one disk pair of the toroidal drive. With such a bisecting carrier, the co-axial drive enables power from an input shaft to be transmitted to a co-axial output shaft in a compact and space saving manner,

20 Claims, 10 Drawing Sheets

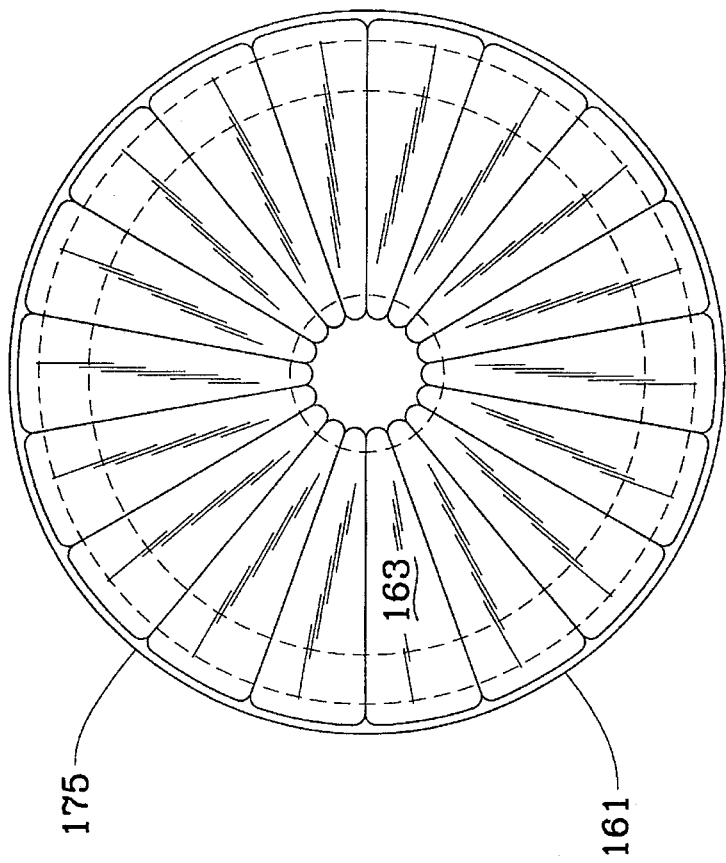
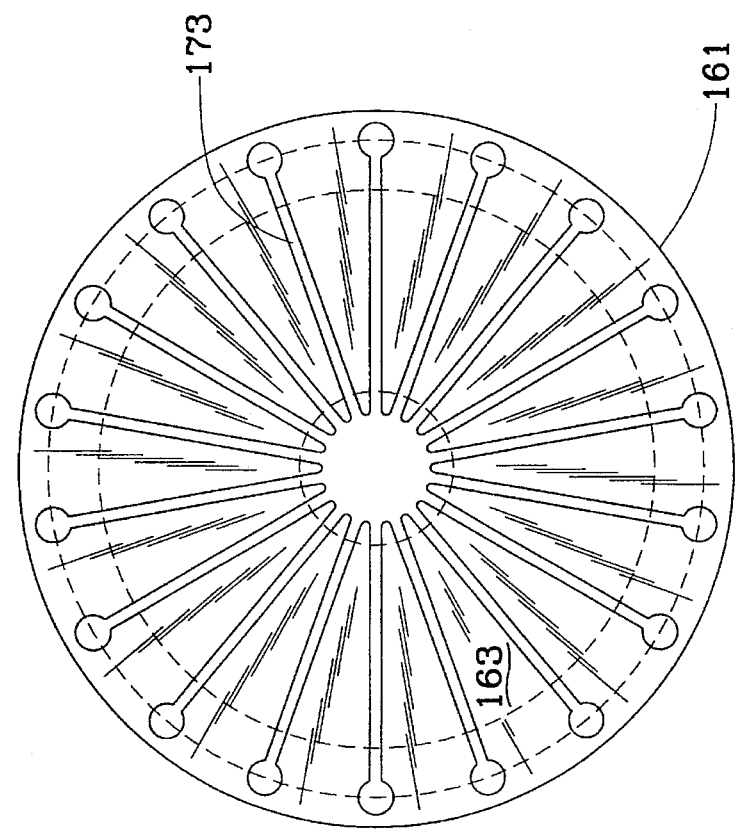

CO-AXIAL DRIVE FOR A TOROIDAL DRIVE TYPE TRANSMISSION

FIELD OF THE INVENTION

The present invention is related to engine transmissions, more particularly to engine transmissions with a toroidal drive, and even more particularly to engine transmissions with a dual cavity toroidal drive and a co-axial input and output.

BACKGROUND OF THE INVENTION

Many types of engine transmission have been developed in the past. One type is a continuously variable transmission which typically includes a toroidal drive having at least one pair of toric traction disks which often react upon each other and which are rotatably supported in a housing along an axis opposite one another to define a toric cavity between them. A motion transmitting traction roller is disposed in the toric cavity. The traction roller is frictionally engaged with the toric disks in circles of varying diameters depending on the transmission ratio, and is so supportive that it can be moved to initiate a change in the transmission ratio. A toroidal type continuously variable drive can have one or more cavities and may be used, for example, to form part of an infinitely variable transmission.

A common type of continuously variable transmission includes a toroidal drive having dual cavities which are defined by two torsionally coupled outboard traction disks which react upon each other and two inboard disks which are positioned between the outboard disks and also react upon each other. One dual cavity toroidal drive of the "off-center type" is disclosed in U.S. Pat. No. 5,368,529. An off-center toroidal drive is usually considered one having an included angle of less than 180° between the traction contacts (i.e., where the roller contacts the disks). An on-center toroidal drive is usually considered one having an included angle of about 180°. The included angle is the angle formed by the lines between the center of the toric cavity and the traction contacts on engaged disks. The usual method for transmitting power through a dual cavity design of the "off-center type" is to input the power to the two outboard disks and use parallel shafting and gearing to transmit power from the inboard disks. One gear mesh used to effect this parallel shafting is usually trapped between the inboard disks. Such a two-shaft system is bulky and difficult, if not impossible, to fit into the available space provided for the transmission of a number of vehicles. In addition, it is often necessary to return to the original center line when transmitting power. In the past, this has required a second gear mesh to be used, in addition to the gear mesh between the inboard disks. Single cavity toroidal drives are also known to take up more space than desired.

Therefore, there is a need for a toroidal type transmission capable of inputting and outputting power along the same axis without having to use parallel shafting. Such a co-axial drive transmission takes up less space than parallel shaft transmissions and can therefore be used in applications with tighter space constraints. In addition, it is easier and less expensive to package a co-axial drive transmission in a housing than it is to so package a parallel shaft transmission.

SUMMARY OF THE INVENTION

The present invention satisfies this need by providing a transmission having a power input and output that run along the same axis of rotation without having to use parallel shafting. In one aspect of the present invention, a transmission is provided which includes a first drive having an input shaft for supplying power to the transmission, an output and a co-axial drive interconnecting the first drive and the output. The first drive, the output and the co-axial drive are operatively adapted for allowing power from the input shaft to be transmitted through the first drive, through the co-axial drive and to the output along substantially the same axis of rotation as that of the input shaft. The first drive, output and co-axial drive are also operatively adapted for allowing power from the output to be transmitted through the co-axial drive through the first drive and back to the input shaft also along substantially the same axis of rotation as that of the input shaft. In this way, the transmission is capable of exhibiting a recirculatory power loop from and back to the input shaft without the need for parallel shafting.

In one feature of this aspect of the present invention, the co-axial drive is a planetary drive with a carrier, and the first drive is a toroidal drive with two coupled traction disks which react at least torsionally, and preferably both torsionally and axially, to one another through the carrier. The toroidal drive can be a dual cavity type, with two outboard traction disks and one inboard traction disk element or two separate inboard traction disks disposed between the outboard disks. The toroidal drive can also be a single cavity type. One of the traction disks can be mounted to rotate with the input shaft, and the carrier operatively adapted to rotate with the input shaft and the other traction disk.

The co-axial drive may be any suitable type of planetary drive including a planetary gear assembly. The carrier for such a co-axial drive can include a hub mounted to rotate with the input shaft and a support flange mounted to rotate with the other traction disk (the one that is not mounted to rotate directly with the input shaft). Preferably, the axial position of the traction disks and planetary assembly are substantially maintained relative to one another.

The traction disks and planetary assembly can be axially held in place with two stops mounted on the input shaft. The toroidal drive and the planetary assembly are held axially between these two stops so that relative axial movement between the various components of the toroidal drive and planetary assembly is substantially limited. As a consequence, relative movement between these various components is substantially only rotational in nature, thereby eliminating the need for axial load bearings with each traction disk. The hub of the carrier and one of the traction disks can each be seated against one of the stops in order to obtain this reduction in relative axial movement.

Another aspect of the present invention is a transmission of the type which includes a toroidal drive and a co-axial drive, with the co-axial drive having a rotating planetary carrier that bisects the reaction path between one disk pair of the toroidal drive. With such a bisecting carrier, the present coaxial drive enables power from an input shaft to be transmitted to a co-axial output shaft in a compact and space saving manner.

In one feature of this aspect of the present invention, the toroidal drive has two traction disks with at least one reaction path therebetween. The traction disks react at least axially or torsionally along one reaction path, and preferably, the traction disks react axially and torsionally along one reaction path, with the carrier bisecting the one reaction path.

The toroidal drive can be a single cavity toroidal drive or, preferably, a dual cavity toroidal drive having two outboard traction disks which react axially and torsionally along at least one reaction path, with the coaxial carrier bisecting this at least one reaction path. The dual cavity toroidal drive also has two inboard traction disks which can be integrally formed into a single element.

The co-axial drive has a plurality of elements carried by its carrier. These elements are operatively adapted to provide a power path between the input and output of the transmission.

In a further aspect of the present invention, a transmission is provided which includes an input and output shaft having substantially coaxial axes of rotation, a toroidal drive with a reaction path between two of its traction disks, and a co-axial drive having a planetary assembly with a rotating planetary carrier bisecting the reaction path between the disks. The input shaft supplies power to the transmission and the output shaft transmits power out of the transmission. One of the traction disks is mounted for rotation with one of these shafts, and the planetary carrier connects together the toroidal drive and the shaft mounting the traction disk. The toroidal drive and the planetary assembly are operatively adapted for allowing power from the input shaft to travel back and forth through the transmission, between the input and output shafts and along the axis of rotation of these shafts, without the need for parallel shafting.

In one feature of this aspect of the present transmission, power is able to travel from and back to the input shaft through the toroidal drive and planetary assembly. The toroidal drive and planetary assembly are operatively adapted for allowing power from the input shaft to be transmitted to the planetary assembly through the toroidal drive, as well as from the input shaft through the planetary assembly, then through the toroidal drive and back to the input shaft. This flow of power from and back to the input shaft all occurs along substantially the same axis of rotation.

The objectives, features, and advantages of the present invention will become apparent upon consideration of the detailed description and the appended drawings.

BRIEF DESCRIPTION OF THE DRAWINGS

FIGS. 8a and 8b are plan views of two exemplary load lever assemblies which can be used in the trunnion/roller assembly of FIG. 7;

DETAILED DESCRIPTION OF THE INVENTION

Although the present invention is herein described in terms of a specific embodiment, it will be readily apparent to those skilled in this art that various modifications, rearrangements, and substitutions can be made without departing from the spirit of the invention. The scope of the present invention is thus only limited by the claims appended hereto.

Figure 1:
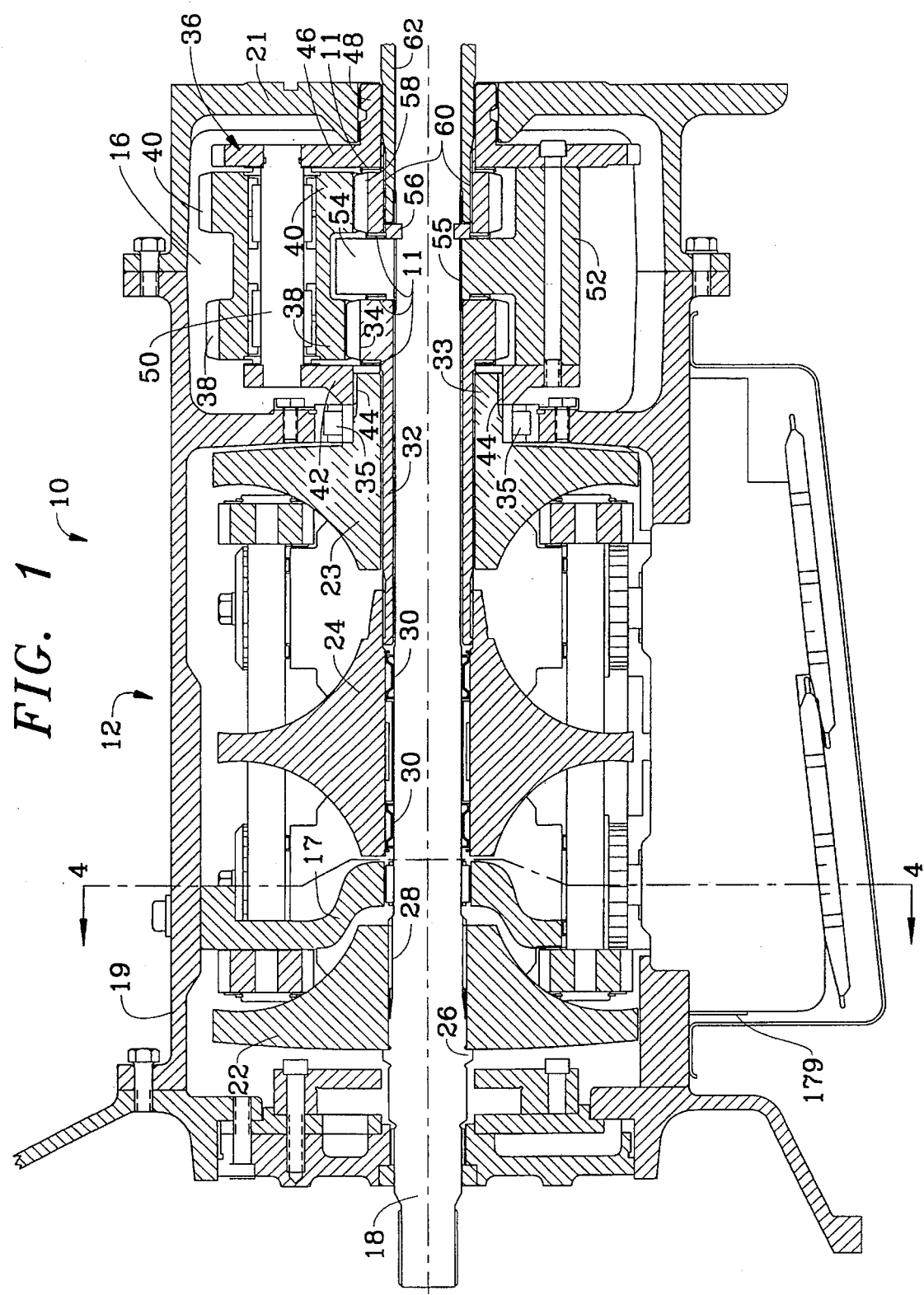
FIG. 1 is a broken-away partially sectioned side view of the front end of one embodiment of the co-axial drive transmission of the present invention, with the dual cavity toroidal type continuously variable drive and the co-axial planetary drive revealed.
Figure 2:
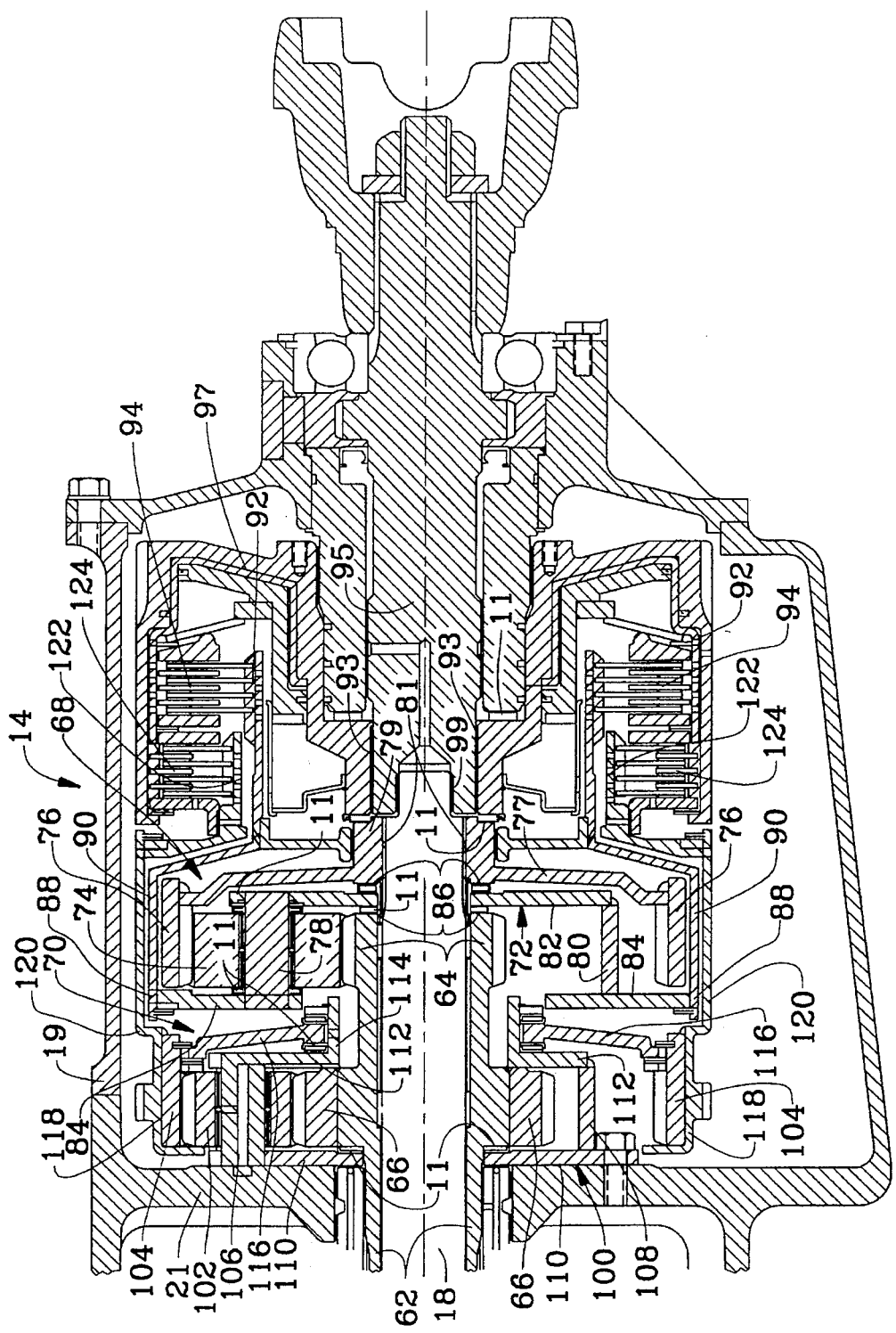
FIG. 2 is a broken-away partially sectioned side view of the rear end of the transmission of FIG. 1, with the output gear section revealed.
Figure 3:
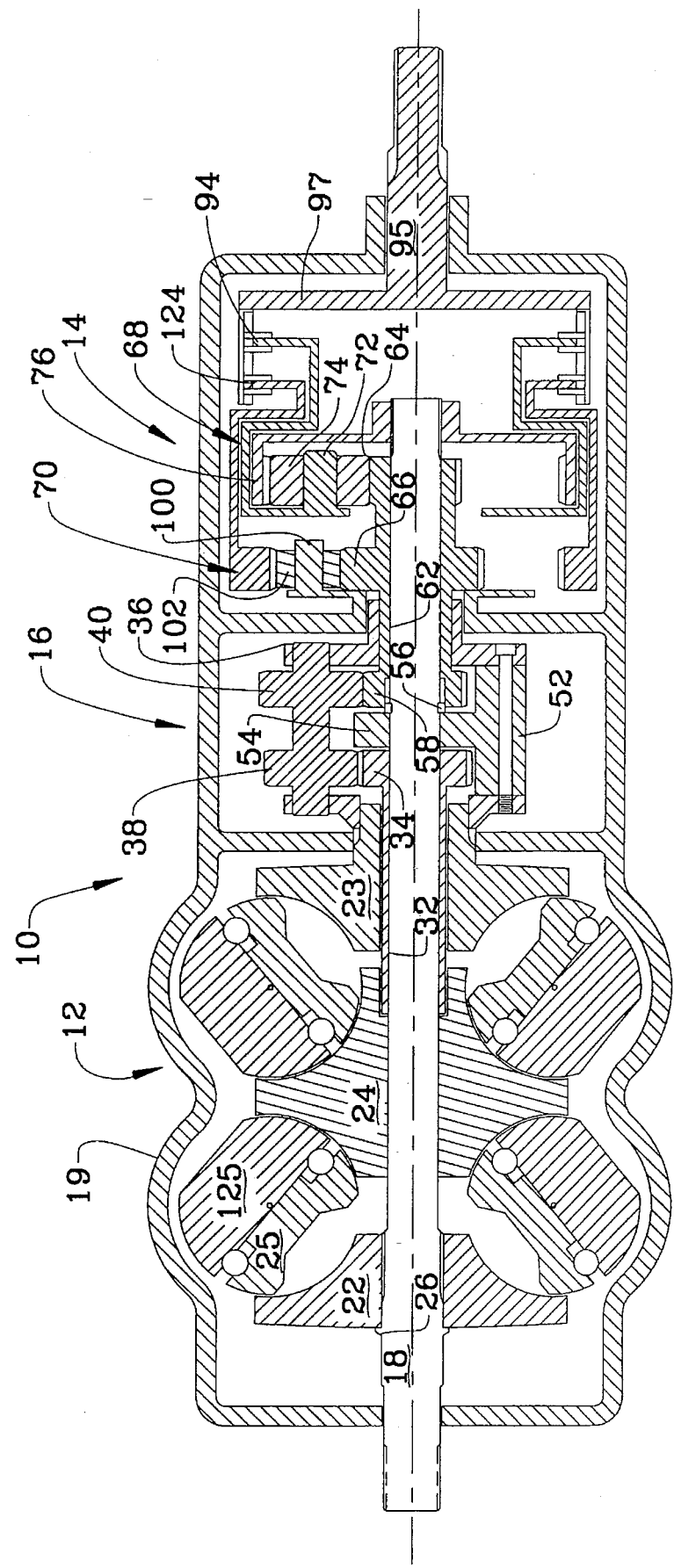
FIG. 3 is a schematic top view of the transmission of FIGS. 1 and 2.

Referring to FIGS. 1–3, one embodiment of a continuously variable transmission (CVT) 10 according to the principles of the present invention is an infinitely variable and regenerative transmission which includes a forward positioned continuously variable drive 12 interconnected to a rearward positioned output gear section 14 (see FIGS. 2 and 3) by a co-axial drive 16. For purposes of clarification, the terms front or forward refer to the left side and rear or rearward refer to the right side of the views shown in FIGS. 1–3. All three elements 12, 14 and 16 are enclosed in a housing 19 and driven off of a main or input drive shaft 18 powered from an engine (not shown). The housing 19 has three chambers, one for each element 12, 14 and 16 of the exemplary CVT 10, separated by walls 20 and 21. A shaft support bracket 17 is mounted at its ends to the inside of the housing 19 to provide support for shaft 18 in the forward housing chamber containing drive 12. The main shaft 18 is mounted with bearings for rotation through a hole formed in the center of the bracket 17. The co-axial drive 16 is a planetary type drive. The drive 12 is a dual cavity toroidal type continuously variable drive, shown as being off-center in this embodiment. It is understood that co-axial drive 16 can be varied in a number of ways including being an epicyclic (as shown) or conventional planetary gear assembly or a type of planetary traction drive. It is also understood that toroidal drive 12 can be varied in a number of ways including being an off-center toroidal drive (as shown) or an on-center toroidal drive. The structure of toroidal drive 12 will initially be disclosed in general to describe its interaction with the co-axial planetary 16.

The dual cavity toroidal drive 12 includes first and second outboard traction disks 22 and 23, and two inboard traction disks formed as one integral element 24 all mounted on shaft 18. Inboard disks 24 are preferably a dual-faced single disk element, as shown. However, inboard disks 24 can also be two separate disks which are positioned back-to-back and simply coupled together in a conventional manner to react in unison. An example of a dual cavity toroidal drive having dual inboard disks is disclosed in U.S. Pat. No. 5,368,529, which is incorporated in its entirety herein by reference. A toric cavity is defined between each outboard disk 22 and 23 and the inboard disk element 24. A pair of motion transmitting traction rollers 25 are disposed in each toric cavity, with one roller 25 being disposed transversely on either side of each cavity (see FIGS. 3 and 4). Each pair of traction rollers 25 are mirror images of the other pair; therefore, only the one pair of rollers 25 are illustrated herein. Each pair of traction rollers 25 are engaged between the inboard disk 24 and one of the outboard disks 22 and 23 in circles of varying diameters depending on the transmission ratio. The rollers 25 are so supportive that they can be moved to initiate a change in the transmission ratio. That is, each roller 25 can be actuated to vary its diameter and provide a substantial normal force at their points of contact with the corresponding disks to sufficiently support the traction forces needed to effect the change in transmission ratio. With shaft 18 being rotated continuously by an engine (not shown), the outboard disks 22 and 23 impinge on the traction rollers 25, causing the traction rollers 25 to rotate. As they rotate, the traction rollers 25 impinge on and rotate the inboard disk element 24 in a direction opposite to that of the rotating outboard disks 22 and 23. The structure and operation of the other elements of the toroidal drive 12, including the traction disks 22–24 and the traction rollers 25, will be discussed in greater detail later on in the specification.

First outboard disk 22 is seated against a forward positioned stop lip 26 formed circumferentially around shaft 18 and is splined at interface 28 for rotation with a section of shaft 18 located rearward of lip 26. Inboard disk element 24 is mounted between outboard disks 22 and 23 on roller bearings 30 which allow rotation around shaft 18. The rearward end of inboard disk element 24 is splined for rotation with a first torque tube 32 which is adapted and disposed for rotation around shaft 18. First tube 32 is disposed concentrically through and adapted to rotate relative to the second outboard disk 23. The rear ends of the first torque tube 32 and the second outboard disk 23 are disposed through an axial opening in the housing wall 20 and into the middle chamber of housing 19 containing the co-axial planetary 16. The rear end of the second outboard disk 23 has a collar 33 extending rearward therefrom which is mounted for rotation in the axial opening with roller bearings 35.

Integral with the rearward end of the first tube 32 is a first sun gear 34 forming an input of the co-axial planetary 16. The epicyclic planetary 16 also includes a first planetary carrier 36 for carrying three pairs of axially joined first and second planet gears 38 and 40 around shaft 18. Preferably, each pair of compound planet gears 38 and 40 is of one-piece construction. Epicyclic planetary 16 does not include a ring gear, as is typically present in conventional planetary gear assemblies. Carrier 36 includes a circular support arm or flange 42 disposed around and splined at interface 44 for rotation with the rear end collar 33 of the second outboard disk 23. The outer race of roller bearings 35 is sandwiched between and in contact with the second outboard disk 23 and the carrier flange 42. Another circular support arm or flange 46 is spaced rearward from flange 42 and includes a collar 48 mounted for rotation in an opening formed through wall 21 and around shaft 18. The support flanges 42 and 46 are fixed relative to one another by three sets of a bearing pin 50 and a spacer block 52. The bearing pins 50 and spacer blocks 52 are equally and alternately spaced around shaft 18. In addition, each bearing pin 50 and its corresponding spacer block 52 are disposed directly across from each other on opposite sides of shaft 18 and rigidly fixed at their ends to flanges 42 and 46. All three spacer blocks 52 are an integral part of and disposed around a central carrier hub 54 splined at interface 55 for rotation with the main shaft 18. The hub 54 of planetary carrier 36 is axially seated forward of and against a stop 56, such as a retainer clip or split ring fixed in a circumferential groove, on shaft 18.

The traction disks 22–24 of the dual cavity toroidal drive 12 and the co-axial planetary 16 are held axially between stop lip 26 and retainer clip 56 so that the axial thrust that is put on the second outboard traction disk 23 is eventually reacted upon by the main shaft 18. Also, in this way, relative axial movement between the various components of the toroidal drive 12 and epicyclic planetary 16 is substantially limited. Consequently, relative movement between the various components of the drive 12 and planetary 16 is substantially only rotational in nature. Having the inboard disks and the outboard disks coupled together and pinned together in this manner eliminates the need for using axial load bearings with each of the disks. While some type of radial bearings are required, the radial loading is usually limited to gear separation loads and gravity loading. Such radial bearings, therefore, do not account for any great power losses. On the other hand, axial force loads on traction disks are almost always large. Therefore, by eliminating the need for axial bearings, a major source of power loss can be eliminated. For this reason, the dual cavity design is preferred.

Each pair of planet gears 38 and 40 is mounted on one bearing pin 50 with roller bearings to allow rotation therearound. The first or forward planet gear 38 of co-axial planetary 16 is engaged with the input sun gear 34 on the rear end of torque tube 32, and the second or rearward planet gear 40 is engaged with a second sun gear 58 forming an output of the co-axial planetary 16. The output sun gear 58 is smaller than the input sun gear 34 and is splined at interface 60 for rotation with the forward end of a second torque tube 62 extending into sun gear 58. The rearward end of second tube 62 extends through the collar 48 of support flange 46 and through the opening in wall 21 to the rearmost chamber of housing 19 containing output gear section 14 of the CVT 10.

Referring to FIGS. 2 and 3, integral with the rearward end of the second torque tube 62 is a third and fourth sun gear 64 and 66 forming the input of a mode one planetary gear assembly 68 and a mode two planetary gear assembly 70 of the output gear section 14, respectively. The mode one planetary 68 is a mixing or summing planetary disposed rearward of the mode two planetary 66 which is a speed reducer and reverser planetary. The mode one planetary 68 includes a planetary carrier 72 for carrying three planet gears 74 around input shaft 18, and an outer annular or ring gear 76. The third sun gear 64 is engaged with the three planet gears 74, which are each engaged with the ring gear 76. Ring gear 76 is fixed to the outer edge of a circular support flange 77 having a collar 79 splined at interface 81 for rotation with shaft 18.

Carrier 72 includes three bearing pins 78 and three spacer blocks 80 that are rigidly fixed at their ends between two circular support flanges 82 and 84 disposed around shaft 18. Each planet gear 74 is mounted on one bearing pin 78 using roller bearings to allow rotation therearound. The pins 78 and blocks 80 are equally and alternately spaced around shaft 18. Each bearing pin 78 and its corresponding spacer block 80 are also disposed directly across from each other on opposite sides of the shaft 18. Flange 82 is disposed rearward of flange 84 and extends from the pins 78 and blocks 80 radially toward the shaft 18 where it is axially trapped between a pair of bearings 86, yet free to rotate around shaft 18. Flange 84 extends from the pins 78 and blocks 80 radially outward with an outer edge splined at interface 88 for rotation with an inner tube 90.

The inner tube 90 extends over the top of the ring gear 76 towards the rear or output end of the transmission 10. At its rearmost end, the tube 90 is splined at interface 92 for rotation with a conventional clutch plate assembly 94. Clutch 94 is splined at interface 93 for direct rotation with an output drive shaft 95 through a clutch retainer 97 in a conventional manner. Therefore, the operation of output gear section 14 between clutch 94 and output shaft 97 will not be described in detail herein. The rear end of input shaft 18 is fit with a bushing 99, allowing rotation in a bore formed in the forward end of output shaft 95. Output shaft 95 is interconnected in a conventional manner to an axle mounting a pair of wheels on a vehicle (not shown).

The mode two planetary 70 is a simple planetary with a fixed planetary carrier 100 for carrying three planet gears 102 around shaft 18, and an outer annular or ring gear 104. Carrier 100 includes three bearing pins 106 and three spacer blocks 108 that are rigidly fixed at their ends between a carrier bracket 110 and a circular carriage flange 112. Carrier bracket 110 and carriage flange 112 are each disposed around shaft 18. The carrier bracket 110 is fixed to wall 21, such as with bolts, and the circular carriage flange 112 hangs off of bracket 110 with a cradle collar 114. Each planet gear 102 is mounted on one bearing pin 106 using roller bearings to allow rotation therearound. The pins 106 and blocks 108 are equally and alternately spaced around shaft 18. Each bearing pin 106 and its corresponding spacer block 108 are also disposed on opposite sides of the shaft 18. Ring gear 104 is fixed to the outer edge of a circular support flange 116 which is axially trapped, yet free to rotate around shaft 18, between a pair of bearings mounted on the cradle collar 114.

Figure 10A:
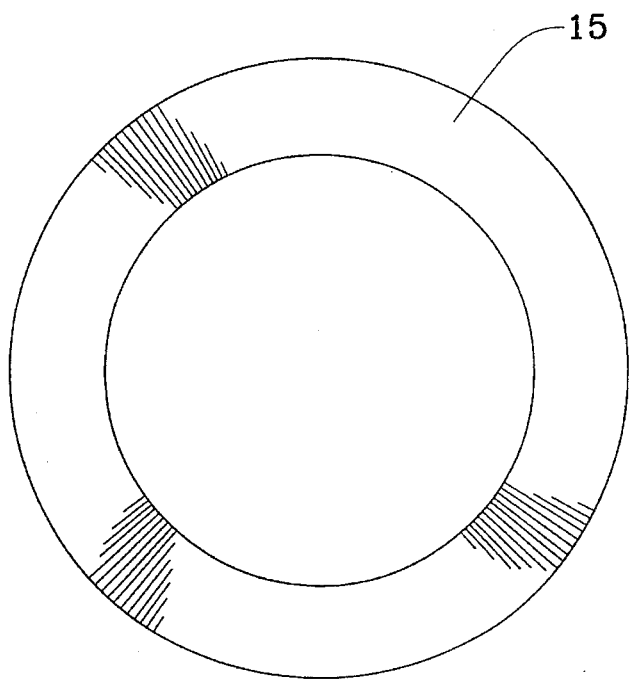
FIGS. 10a–c are a plan view, a side view under load and a side view unloaded, respectively, of a thrust bearing preload spring.
Figure 10B:
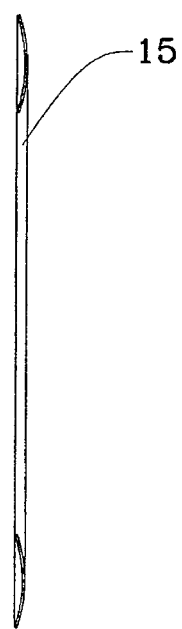
Figure 10C:
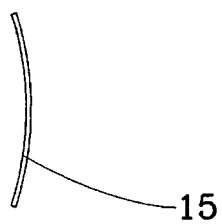

The fourth sun gear 66 is engaged with the three planet gears 106, which are each engaged with the ring gear 104. Ring gear 104 is splined at interface 118 for rotation with an outer tube 120. The tube 120 extends over the top of the mode one planetary 68 towards the rear or output end of the transmission 10. At its rearmost end, the tube 120 is splined at interface 122 for rotation with a conventional clutch plate assembly 124, located forward of clutch 94. Clutch 124 is also splined at interface 93 for direct rotation with output drive shaft 95 through clutch retainer 97 in a conventional manner. Therefore, which planetary 68 or 70 transmits power to output shaft 95 depends on which clutch 94 or 124 is engaged, respectively. Preferably, all of the gears used in the co-axial planetary 16 as well as those used in the output gear section planetaries 68 and 70 are helical gears. Spring loaded needle thrust bearings are used wherever the reference numeral 11 is indicated. To cut down on energy loss and to provide a preload, a specially designed spring 15, as shown in FIGS. 10a–b, is preferably used to spring load each thrust bearing 11. There is one spring 15 per thrust bearing. The spring 15 can be behind the thrust washer (not shown) for the bearing or it can replace the thrust washer.

The Toroidal Drive

The toroidal drive 12 used in this embodiment is a dual cavity design with the co-axial planetary 16 mounted at its rear and bisecting the shared reactions of the outboard disks 22 and 23. This allows the single piece inboard traction disk element 24 to be used instead of two separate inboard disks. The output of the inboard disk element 24 is transmitted through torque tube 32 which is concentric to the input shaft 18 and the rear most outboard disk 23. Since there is no parallel shafting, bearings mounted along the input axis (i.e., the central longitudinal axis of shaft 18) are for gravity and bounce loading only.

Figure 4:
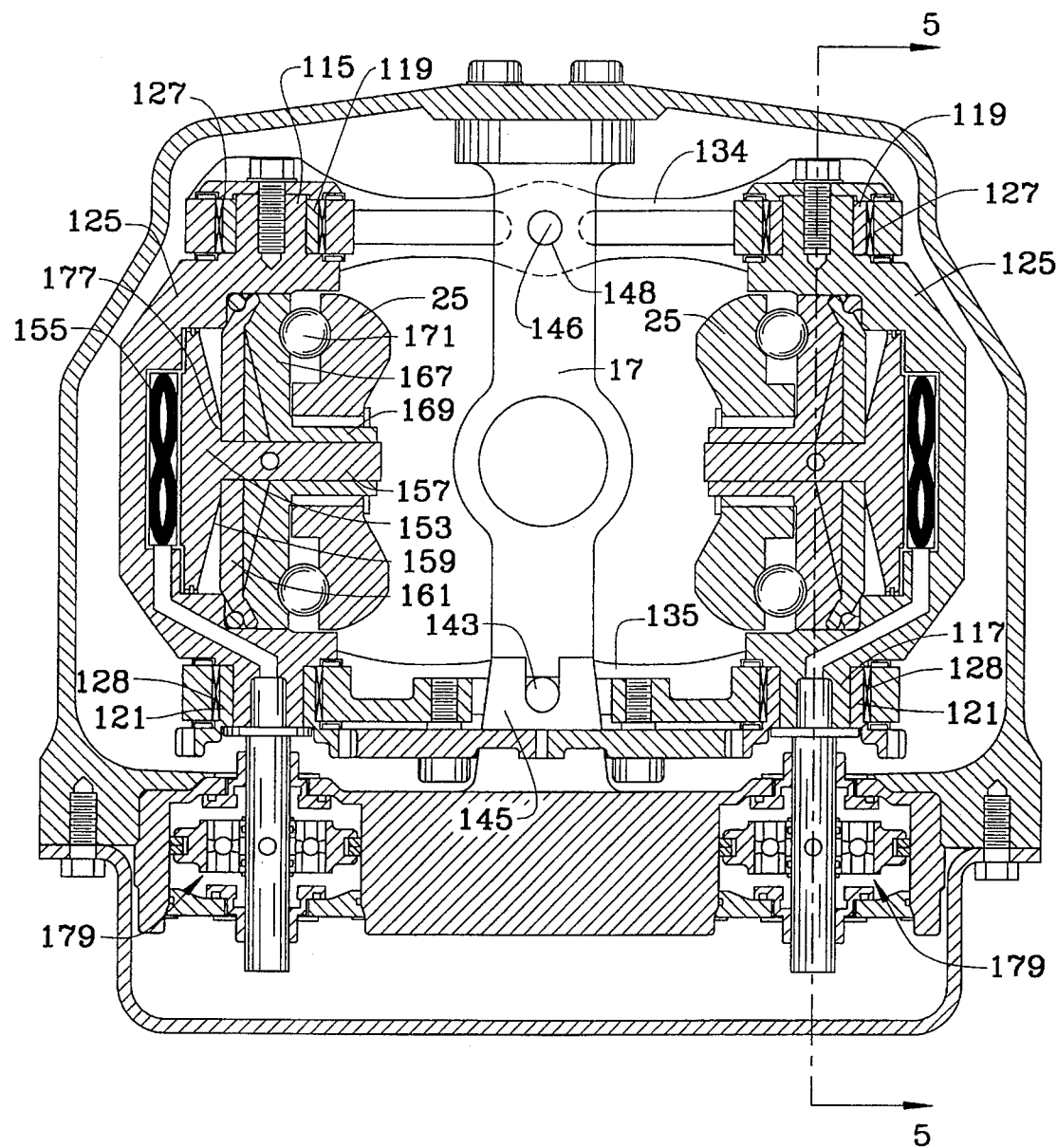
FIG. 4 is a sectional end view taken along lines 4—4 through the forward cavity of the toroidal drive of FIG. 1.
Figure 5:
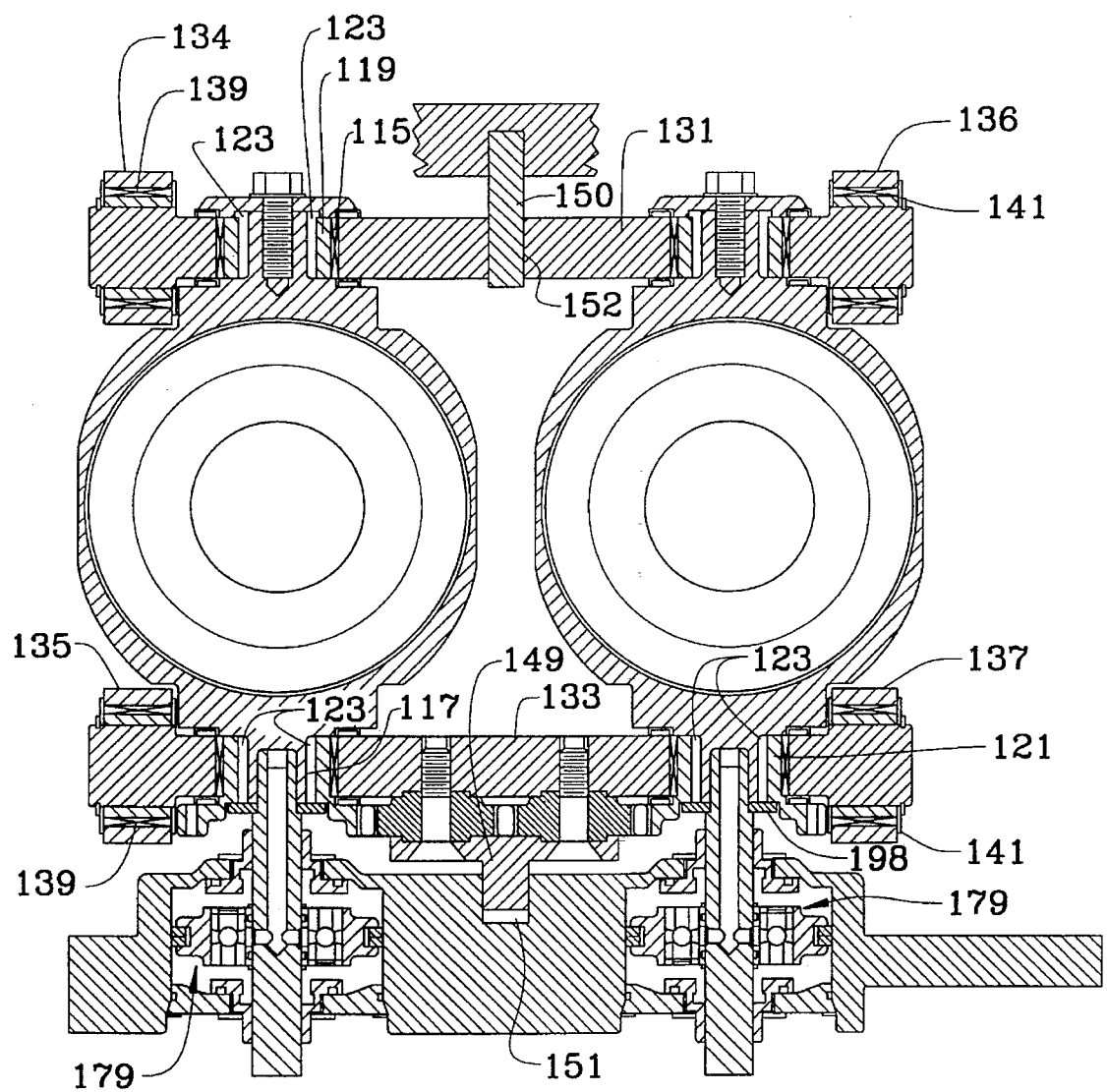
FIG. 5 is a sectional side view taken along lines 5—5 of FIG. 4.
Figure 6:
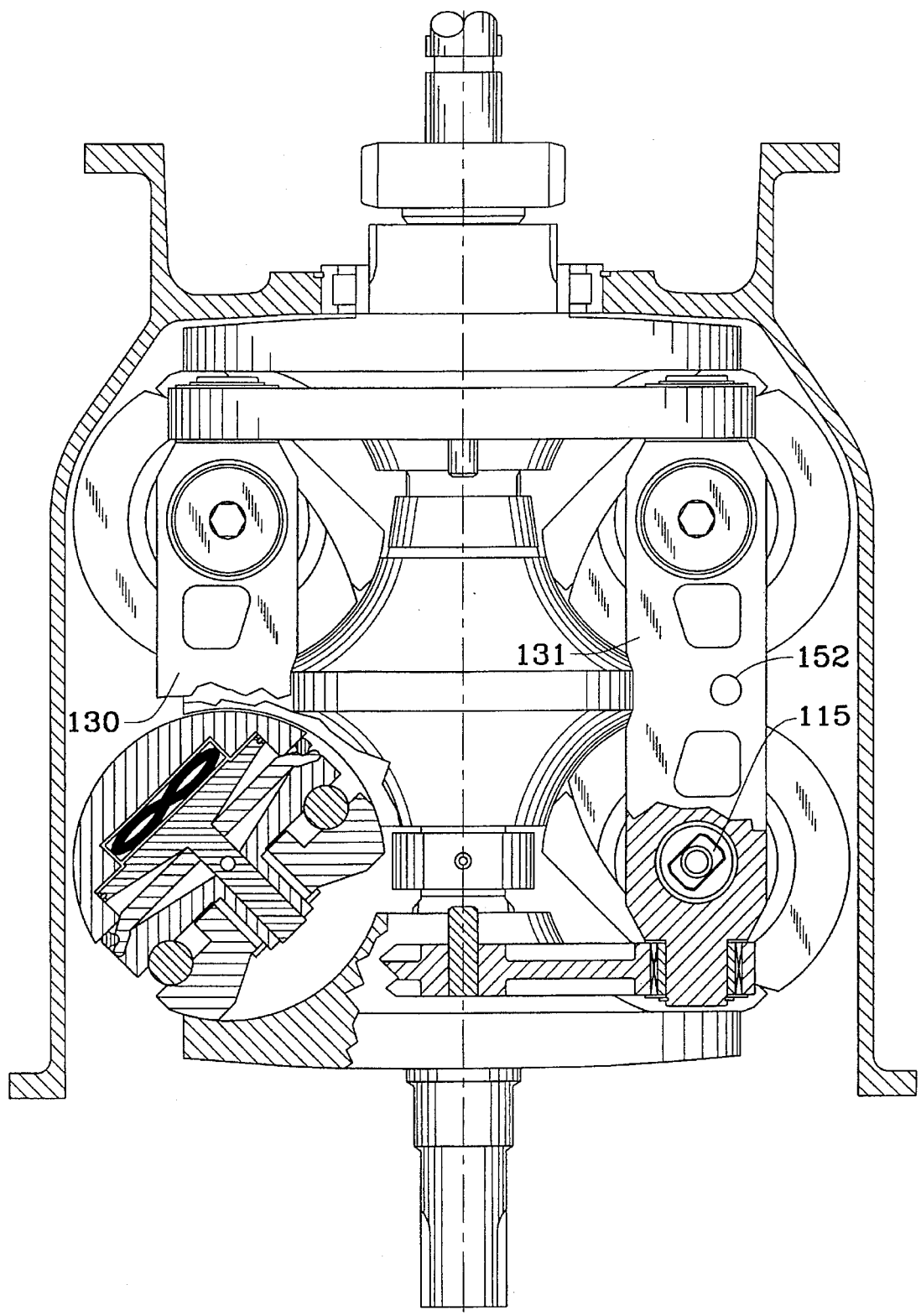
FIG. 6 is a partially broken-away and sectioned top view of only the toroidal drive of FIG. 1, with the front end of the housing removed.
Figure 7:
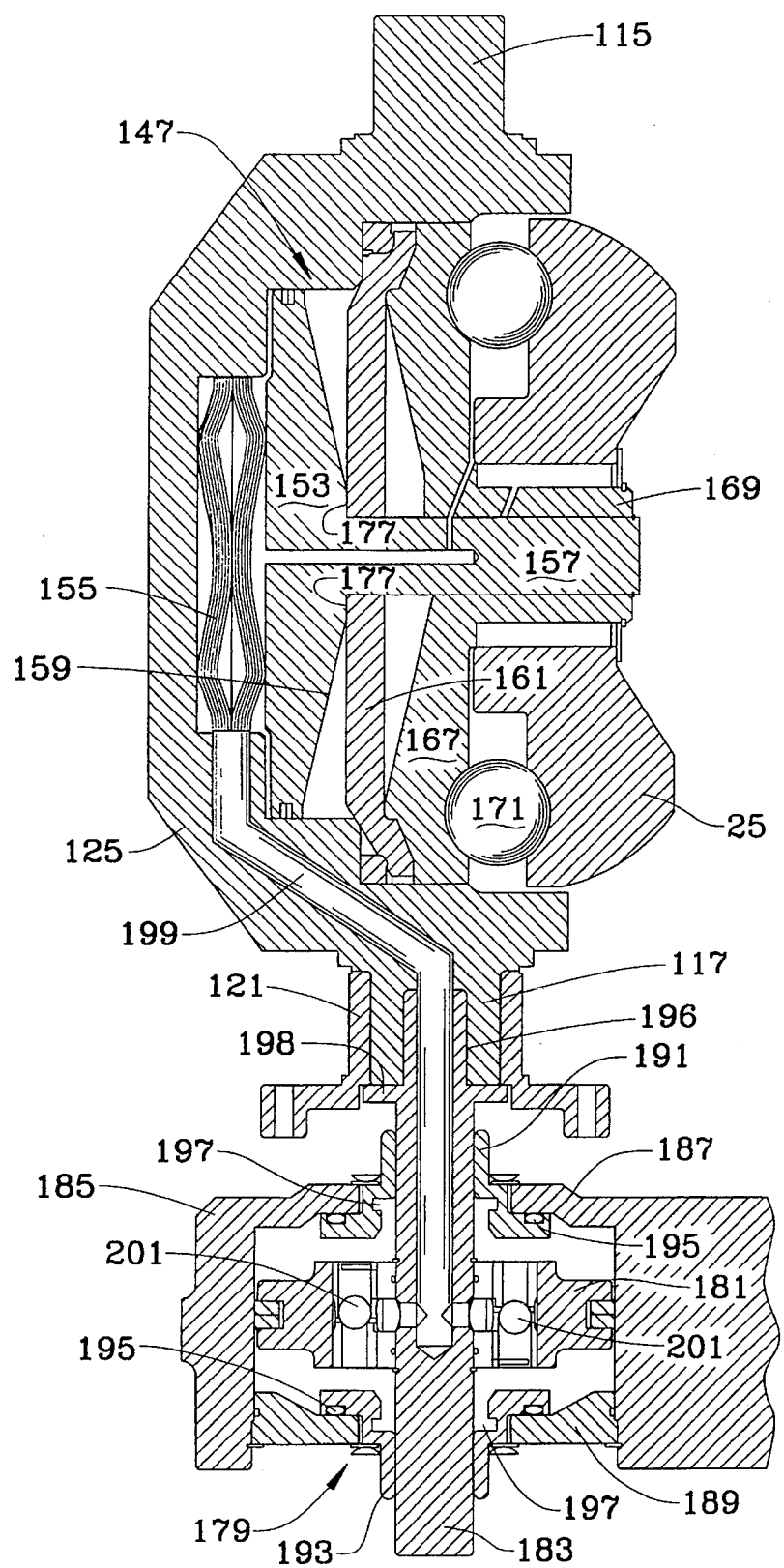
FIG. 7 is an enlarged sectional side view of one traction trunnion/roller assembly and control piston assembly used in the toroidal drive of FIG. 1.

Referring to FIGS. 4–7, the toroidal drive 12 includes two end supported trunnions 125 disposed in each toric cavity, with one trunnion 125 being disposed transversely on either side of each cavity (see FIGS. 3 and 4). Each pair of trunnions 125 are mirror images of the other pair; therefore, only one pair of trunnions 125 are illustrated in an end view herein. One of the traction rollers 25 is mounted for actuation in each of the trunnions 125 in a manner described in detail below. Each trunnion 125 is mounted in anti-friction bearings 127 and 128 for free rotation at its top end and bottom end, respectively. A linkage system, as described below, mounts the bearings 127 and 128, supports the trunnions 125, and is adapted to allow each trunnion 125 to move freely in a vertical plane. Thus, these trunnions 125 are the end supported type that are controlled by translating the trunnion up and down. The top and bottom ends of each trunnion 125 are machined to form an upper and lower post 115 and 117, respectively, each having a slightly rectangular cross section and chamfered corners. An upper and lower bushing 119 and 121 is respectively disposed between the top and bottom bearings 127 and 128 and the upper and lower posts 115 and 117 of each trunnion 125. Each bushing 119 and 121 has a circular outer surface in direct contact with bearings 127 and 128, respectively, with a rectangular hole formed through its center for receiving one post. The rectangular cross section of each post 115 and 117 is adapted to snugly fit in the rectangular hole of its corresponding bushing 119 and 121 only along two opposing sides. In this way, each trunnion 125 (i.e., at its posts 115 and 117), and therefore its corresponding traction roller 25, is able to slightly slide back and forth in its respective bushing 119 and 121, as evidenced by the gap 123 shown on either side of the posts 115 and 117 in FIG. 5. This adjustability of each trunnion 125 is sufficient to move its corresponding roller 25 enough to adjust for a mismatch in position between the trunnion 125 and the center line of the disks 22–24 or the toric cavity center line. Without adjusting for such a misalignment, one roller/disk contact could be more heavily loaded than another and some of the support bearings may be more heavily loaded than they should be. Because of this structure, the present rollers 25 do not have to move back and forth across their corresponding trunnion 125 to compensate for such a mismatch, as was done with rollers mounted on prior end supported trunnions.

The trunnions 125 are supported relative to one another within the first chamber of the housing 19 by a linkage system that connects the two cavities of the toroidal drive 12 such that the longitudinal reaction of one cavity is balanced by that of the second cavity. This linkage system includes two top side links 130 and 131 that are transversely spaced on either side of the first housing chamber and two bottom side links 132 and 133 that are similarly spaced therebelow. The two top side links 130 and 131 and the two bottom side links 132 and 133 are joined at their front and rear ends by a top and bottom front cross link 134 and 135 and a top and bottom rear cross link 136 and 137, respectively. Each of the cross links 134–137 cross the toroidal drive 12 at right angles to the longitudinal or input axis of the shaft 18. One top and bottom trunnion bearing 127 and 128 is mounted at each end of the top and bottom side links 130–133, respectively. In addition, the front and rear ends of each of the side links 130–133 are mounted in front and rear end bearings 139 and 141, respectively. One front and rear end bearing 139 and 141 is mounted at each end of the front and rear cross links 134–137, respectively.

Each of the lower cross links 135 and 137 has a central pin support 143 mounted thereon. Each lower pin 143 is seated in the notch of a fork 145 formed on the inside of the housing 19. The forks 145 are disposed inboard of the lower cross links 135 and 137. At least the forward upper cross link 134 also has a central pin support 146 mounted thereon which extends into a slightly oblong hole 148 formed in the shaft support bracket 17. The major axis of the oblong hole 148 is vertical to allow slight vertical movement of the pin 146 therein, and thus the trunnions 125. These pin supports 143 and 146 help to prevent gravity or bounce loading from inadvertently offsetting both trunnions 125 in one cavity in the same direction. Offsetting is defined herein as vertical motion of the trunnions 125. Offsetting of two trunnions 125 in the same cavity in the same direction is undesirable because it causes opposite steering vectors on the rollers 25 and scuffing or scrubbing of the traction surfaces between the rollers 25 and the disks 22–24. Furthermore, two general types of locators are used to maintain the toroidal drive 12 longitudinally in position within the forward chamber of housing 19. One of these locators includes the lower cross links 135 and 137 being loosely constrained in the longitudinal direction by contact with their corresponding fork 145 (i.e., housing 19). This locates the entire toroidal drive 12 positioning since the disks 22–24 are otherwise free to float in the longitudinal direction. The other locator is supplied by bolting a rectangular block 149 to the underside of each of the lower side links 132 and 133 and by mounting a support pin 150 in the housing 19. Each block 149 is seated in an oblong slot 151 formed in the housing 19 with its major axis oriented transversely (i.e., perpendicular to the axis of rotation of the shaft 18). Each support pin 150 is disposed in a transversely oriented slightly oblong slot 152 formed through the each of the upper side links 130 and 131. Thus, the side links 130–133 can move transversely within the slots 151 and 152 while being constrained longitudinally. Alternatively, this other locator may be supplied by using only the blocks 149 and slots 151, only the pins 150 and slots 152, or a combination thereof.

The cross links 134–137 sufficiently constrain the separating or transverse force between the two trunnions 125 in each cavity. At the same time, being interconnected by bearings in the manner described above allows for a significant degree of freedom of movement with less friction while supporting the trunnions 125. This is important because any stiction (i.e., intermittent sticking) or friction in the support of the trunnions 125 can lead to an upset in the balance of the control forces on the trunnions 125 (i.e., the forces exerted by the control piston assembly 179, discussed below) and hence an upset of the balance of the transmitted or tangential force on the trunnions 125 (i.e., the rubbing force between the corresponding traction rollers and disks), resulting in the rollers 25 running at slightly different ratios and fighting against each other. This roller fighting will reduce the capacity of the drive.

The contact force between each roller 25 and its corresponding disks (i.e., the normal force for the traction contacts) is provided by a roller axial loading force from a lever assisted hydraulic piston or cylinder assembly 147 mounted in each of the trunnions 125. Each piston assembly 147 maintains proper loading between the rollers 25 and corresponding disks and includes a load piston 153, preloaded with a series of wave springs 155. Each load piston 153 has an alignment shaft 157 extending out from the center of its face 159 and through a hole formed in the center of the corresponding traction roller 25. Each load piston 153 should push its roller 25 hard against the corresponding disks with sufficient force to prevent slippage along the interface between its roller and disks as the disks are rotating. The loading force from the piston 153 is amplified through a load lever disk 161 to maintain the high loads required. The load lever disk 161 has a plurality of pie shaped levers 163 that are disposed around and extending radially out from the shaft 157 directly over the face 159. A circular thrust plate 167 is disposed between each load lever disk 161 and its corresponding traction roller 25. The thrust plate 167 includes an alignment collar 169 disposed around shaft 157 and through the roller 25. A plurality of bearing balls 171 are disposed between each traction roller 25 and its corresponding thrust plate 167, allowing the roller 25 to freely rotate around shaft 157 (i.e., the axis of rotation of the roller 25). The levers 163 are formed, for example, by making radial slits 173 in the disk 161 (see FIG. 8a) or as separate levers kept together by a retainer 175 (see FIG. 8b). Such a load lever disk is disclosed in U.S. Pat. No. 5,299,987 which is incorporated by reference in its entirety herein.

The face 159 of each load piston 153 is beveled to angle back from shaft 157. The face 159 of the piston 153 includes an area 177 of controlled curvature where the lever disk 161 contacts the piston face 159 (i.e., where the levers 163 are acted upon by the piston 153). The radius of curvature of this area 177 is controlled such that the lever ratio is a decreasing function as the piston 153 moves along the axis of its shaft 157 toward the roller 25. In other words, a curvature is formed on each piston face 159 at area 177 to control the load lever ratio as the piston 153 starts to extend. As the piston 153 extends, the contact points between the lever disk 161 and the piston face 159 moves radially out from the shaft 157. To properly control the load lever ratio, these contact points should gradually and continuously move away from shaft 157 as piston 153 extends. This gradual movement can be obtained by gradually curving (i.e., having a large not a sharp radius of curvature) this area 177 away from shaft 157. An area 177 having a radius of curvature of about 1.0 inch has produced satisfactory results. Such a controlled curvature 177 helps to insure that each piston's traction coefficient (i.e., the ratio of the tangential force to the contact force exerted by the roller against the disks) increases as the piston 153 extends. Because the traction coefficient is increasing, if one piston 153 tries to extend more than the others, it will run into more resistance the further it extends. So, while one piston 153 may extend slightly further than the others, it will quickly stop because the hydraulic pressure required for it to go any further will be enough to cause the others to catch up. Therefore, one trunnion's load piston 153 will not race out ahead of another trunnion's piston 153, since it would require a greater oil pressure in that piston 153 to achieve a greater extension. The operation of trunnions with hydraulically loaded rollers is well known. Therefore, the operation and actuation of the rollers 25 in their trunnions 125 has not been discussed in greater detail than herein disclosed.

Below each trunnion 125 is a hydraulic control piston or cylinder assembly 179 for controlling the transmission ratio of the toroidal drive 12 by vertically positioning the trunnion 125. Each control piston assembly 179 includes a control piston 181 mounted on a shaft 183 for vertical movement up and down. The piston 181 is disposed in a cylinder 185 between a top cover 187, integral with cylinder 185, and a removable bottom cover 189. The upper end of the mounting shaft 183 extends through an upper control seal bushing 191 disposed through a slightly oversized hole formed through the top cylinder cover 187. The lower end of the shaft 183 extends through a lower control seal bushing 193 disposed through a slightly oversized hole formed through the bottom cylinder cover 189. Since the roller/trunnion assemblies do not rotate about a fixed center, the control piston 181 must be free to move horizontally to eliminate any chance of binding. The oversized holes in covers 187 and 189 provide the control piston 181 with this freedom of movement. Each control bushing 191 and 193 is sealed against the inside surface of its corresponding cylinder cover 187 and 189 by a groove seated O-ring 195. If desired, leakage of hydraulic fluid from between the shaft 183 and the bushings 191 and 193 can be prevented by disposing an elastomeric seal (e.g., teflon rubber) therebetween, such as inside a circumferential groove 197 formed in each bushing 191 and 193. The upper end of each mounting shaft 183 is snugly disposed inside an axial bore 196 formed in the lower end 117 of its corresponding trunnion 125. A washer seal 198 is seated snugly around each mounting shaft 183, between a shoulder formed on the inside of the lower bushing 121 of the corresponding trunnion 125 and a shoulder formed in the mounting shaft 183, effectively sealing the hydraulic connection between the trunnion 125 and shaft 183. The outer diameter of the seal 198 is sized smaller than the shoulder on the lower bushing 121 so it can move sideways with the trunnion 125 and maintain the seal.

Each control piston assembly 179 and the corresponding load piston assembly 147 are hydraulically interconnected by a passageway 199 formed through the trunnion 125, passing axially through the mounting shaft 183 and splitting off into four passages fanning radially out through the control piston 181, each leading to a check valve 201 disposed vertically through the piston 181. Each control cylinder 185 is selectively linked hydraulically to its corresponding trunnion 125 by way of its four check valves 201. Both assemblies 147 and 179 are supplied with pressurized hydraulic fluid or oil by the same hydraulic loading system (not shown). One such as the hydraulic system is disclosed in U.S. patent application Ser. No. 08/319,669, filed Oct. 7, 1994 and entitled LOADING DEVICE FOR CONTINUOUSLY VARIABLE TRANSMISSION, which is assigned to the assignee of this application and is incorporated herein by reference in its entirety.

The hydraulic pressure positions the vertical height of the rollers 25 (i.e., trunnions 125) between the disks 22–24 and is the torque reaction point between the input disks 22 and 23 and output disk element 24. The pressure must exactly balance the torque being transmitted at any given time. If the position pressure is too high, the toroidal drive 12 will up ratio. If the pressure is too low, the toroidal drive 12 will down ratio. The pressure raises or lowers the rollers 25 relative to the disks 22–24. Each roller 25 acts like a caster, following the path of least resistance, and reacting to the forces at the contact points between the disk and roller. The result is a simple hydraulic system to control the transmission ratio at all times. The ratio of the control piston area to the load piston area and the load lever ratio will determine the ratio of the transmitted force (i.e., rubbing force) to the contact force between the disks and rollers.

There is a spool valve (not shown) located in the housing 19 immediately below the toroidal drive 12. This valve modulates the hydraulic oil pressure to position the rollers 25. The spool valve maintains the proper pressure by having an input signal from two sources. The first source is a mechanical link to a variable reluctance electric motor (not shown) which positions the spool valve through a lead screw. The electric motor is, in turn, controlled by a computer (not shown). The second input source to the spool valve is another mechanical link (a feedback link). The feedback link connects the valve to the trunnion 125. If the rollers 25, via the trunnions 125, move up or down or rotate to a new ratio angle, the link moves the valve to boost or reduce the oil pressure to bring the toroidal drive 12 back to the desired ratio. To summarize, the computer selects the desired ratio via the electric motor, and the feedback link keeps the toroidal drive 12 at the ratio selected by the computer. To reduce pumping losses and improve efficiency, it has been found desirable to maintain a line pressure of about 25 psi above the required pressure to support the trunnions 125. A spring loaded spool valve is used to maintain this pressure differential.

Figure 9:
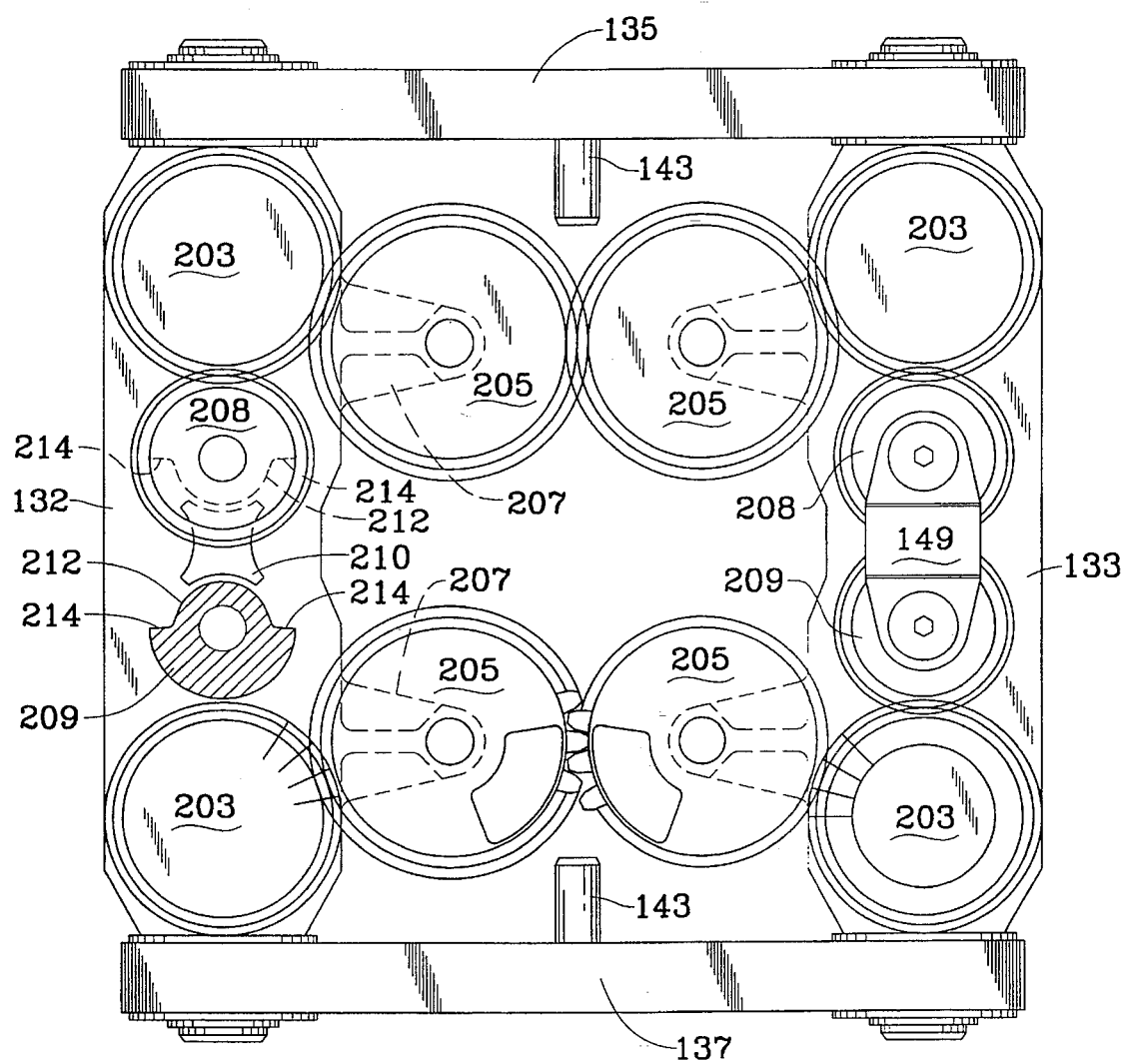
FIG. 9 is a partially broken away bottom view of the train of phase gears used in the toroidal drive of FIG. 1, with the lower links of the trunnion linkage system.

Referring to FIG. 9, to prevent the trunnions 125 from wandering grossly out of rotational phase with each other when the above described hydraulic loading system is inactive, the bottom ends of the trunnions 125 are interconnected by a train of phase gears. One end phase gear 203 is formed as the lower part of each lower trunnion bushing 121. Each end phase gear 203 is meshed with one of two other side link connecting phase gears 205. Each link connecting gear 205 is mounted for rotation on one of two side link arms 207 extending inward from each lower side link 132 and 133. The arms 207 are adapted so that each connecting gear 205 on one side link 132 is meshed with only one gear 205 directly opposite it on the other side link 133. Meshed between the two end gears 203 under each side link 132 and 133 are two meshed rotation limiting gears 208 and 209, used to limit the rotation of the gears in this train. Each limiting gear 208 and 209 is mounted for rotation with a bushing around one of the bolts used to secure the corresponding rectangular block 149 to the underside of its lower side link 131 and 133. A generally cross shaped protrusion 210 extends down from the underside of each side link 131 and 133, between each pair of limiting gears 207 and 208. Each protrusion 210 extends down into a space provided by two opposing semi-circular shoulders 212, one shoulder 212 being formed around the axis of rotation in each limiting gear 207 and 208. Thus, each protrusion 210 prevents further rotation of its corresponding gears 207 and 208 when the end 214 of at least one shoulder 212 makes contact with the protrusion 210.

Operation of the CVT

In operation, the main shaft 18 of CVT 10 is rotated continuously by an engine (not shown). The rotation of shaft 18, in turn, directly rotates the first outboard traction disk 22, the hub 54 of planetary carrier 36 and the collar 79 of the mode one planetary ring gear 76, respectively through the splined interfaces 28, 55 and 81, all in the same direction. Rotation of the co-axial planetary carrier 36 causes the second outboard traction disk 23 to also rotate in the same direction as shaft 18. For the purpose of this description, rotation of the shaft 18 will be referred to as being in a positive direction and any oppositely rotating element as being in a negative direction.

Rotating disks 22 and 23 impinge on and rotate traction rollers 25 in a manner well known and standard for toroidal type drives. The traction rollers 25 then impinge on and cause the inboard traction disk element 24 to rotate in a negative direction. Inboard traction disk element 24 then rotates the first sun gear 34 of co-axial planetary 16 in a negative direction through torque tube 32. The rotational speed of the first sun gear 34 is relative to that of the planet carrier 36 and hence the planet gears 38 and 40. Thus, the planet gears 38 and 40 are rotated in a positive direction by the sun gear 34. Accordingly, second sun gear 58 is rotated in a negative direction by planet gear 40.

The mode one planetary 68 has two inputs, sun gear 64 and ring gear 76, and one output, flange 84. The negative rotation of the second sun gear 58 of epicyclic planetary 16 rotates the third and fourth sun gear 64 and 66 of the mode one and two planetaries 68 and 70 in the negative direction through the second torque tube 62, respectively. The ring gear 76 of planetary 68 is rotated in a positive direction by the engine through shaft 18. The positive and negative rotation of gears 76 and 64 causes the planet gears 74 to rotate in a positive direction. Even so, the positive and negative influence of ring gear 76 and sun gear 64 can add or subtract from each other and cause the carrier 72 of planetary 68 to rotate in a positive direction around shaft 18 when the influence of the ring gear 76 is greater, remain stationary when their influences balance each other or even rotate negatively when the influence of the sun gear 64 is greater. The sum of these two influences, whatever it is, is the output generated at the splined interface 88 leading to clutch 94. If clutch 94 is engaged, this output is then transmitted to output shaft 95 through clutch retainer 97. Output shaft 95 rotates in the same direction of rotation as the mode one carrier 72. In this way, the mode 1 planetary 68 functions as a summing or mixing planetary gear assembly, enabling output shaft 95 to be rotated in a positive or negative direction or kept stationary.

When planetary 68 is selected through clutch 94, the transmission 10 is in a regenerative mode. In the regenerative mode, some of the power that is transmitted from the engine, through shaft 18 and into ring gear 76 is siphoned-off and routed back to the second sun gear 58 of the co-axial drive 16 through planet gears 74 and sun gear 64. From the co-axial sun gear 58, this siphoned-off power is transmitted back to the main shaft 18 of the engine through the continuously variable drive 12 and the co-axial drive 16. How much power is siphoned-off is determined by the ratio or roller angle of the trunnions 125 in each toric cavity. How the trunnion angle of a dual cavity toroidal drive is changed is well known, does not form a basis for the present invention, and will not be discussed in detail herein.

As the rotation of the second co-axial sun gear 58 is affected, so too is the rotation of the sun gear 34 and carrier 36 through the pairs of planet gears 38 and 40. Changes in the rotation of carrier 36 affect the rotation of the main shaft 18 directly through hub 54 and indirectly through the toroidal drive 12 by directly affecting the rotation of the second outboard traction disk 23, and in turn, the first outboard traction disk 22. In this way, the CVT 10 exhibits a recirculatory power loop between the output gear section 14 and the continuously variable drive 12 through the co-axial drive 16. There is also a secondary power loop exhibited by the CVT 10 between the continuously variable drive 12 and the co-axial drive 16, through the co-axial carrier 36. This secondary power loop is slightly split torque and dominated by the recirculatory power loop.

If enough power is diverted away via the mode one sun gear 64, the carrier 72 will not rotate at all. This condition is often referred to as a geared neutral condition. If even more power is diverted away via sun gear 64, the rotation of carrier 72 will actually reverse and go opposite to the direction of rotation of ring gear 76. In this way, the transmission 10 is sent into reverse. The mode 1 planetary 68 can, therefore, send transmission 10 from a small reverse regime through a geared neutral or zero output speed and then into a forward speed. The forward speed of the mode one carrier 72 is low. The mode 2 planetary 70 supplements the forward ratio of the mode 1 planetary 68 to enable greater forward speeds to be attained. When the maximum forward speed-up ratio of the mode one planetary 68 is reached, the transmission 10 is shifted from the mode one planetary 68 to the mode two planetary 70 by shifting from clutch 94 to clutch 124. The clutches are shifted by disengaging clutch 94 and engaging clutch 124, when the mode one carrier 72 rotates at the same speed as the mode two ring gear 104.

In the operation of the mode 2 planetary 70, power from shaft 18 is transmitted through co-axial drive 16 to rotate the sun gear 66 in a negative direction. Sun gear 66 rotates the planet gears 102 in a positive direction, which rotate the ring gear 104 in a positive direction. Ring gear 104 directly rotates the output tube 120 which extends back to the second set of clutches 124, to eventually rotate the output shaft 95 in a positive direction. Because its carrier 100 is fixed to the wall 21, there is only one input and one output for the mode two planetary 70. Thus, when the mode one planetary 68 is disengaged, the mode two planetary 70 can send the transmission 10 from a reverse mode to a forward mode by reducing the speed and then reversing the rotation of the carrier 72. The mode two planetary 70 also allows the transmission 10, while in its forward regime, to reach its upper operating speeds by transmitting power from input shaft 18 to output shaft 95 without any power being siphoned back to shaft 18. When the recirculating power loop is interrupted in this way, the transmission 10 is in its direct mode.

Thus, there are two power paths through the front end of the transmission 10. One path is from the main shaft 18 to the co-axial planetary carrier 36, and the other path is from the main shaft 18, through the toroidal drive 12 (i.e., inboard disk element 24) and to the input sun gear 34 of the co-axial planetary 16. Because the output sun gear 58 is smaller than the input sun gear 34, rotation of the carrier 36 by shaft 18 drives the output sun gear 58 in a negative direction. Because the toroidal drive 12 drives the input sun gear 34 in a negative direction, the input gear 34 also drives the output sun gear 58 in a negative direction. Accordingly, both of the power paths through the front end of the transmission 10 drive the output sun gear 58 in the negative direction.

For the direct or second mode of the transmission 10, where the mode two planetary 70 is engaged and the transmission is in the forward regime, the two power paths share the total power flow, with each branch handling less than 100% of the power supplied by shaft 18. In the regenerated or first mode of the transmission 10, the shaft 18 is connected to the mixing planetary 68 and a portion of the power from the planetary 68 is recirculated through the toroidal drive 12. This recirculated power can exceed 100% of the power supplied by shaft 18. In addition, while shaft 18 has herein been described as supplying power into CVT 10 and shaft 95 has been described as transmitting power out of CVT 10, the flow of power in and out of CVT 10 can be reversed, with shaft 95 being the input and shaft 18 being the output.

A main purpose of the co-axial drive of the present invention is to enable the input shaft and the output shaft of a transmission, incorporating the principles of the present co-axial drive, to be on the same axis without the need for parallel shafting. Without parallel shafting, a transmission according to the principles of the present invention is easier to package because it is long and narrow rather than wide. The use of a co-axial drive according to the present invention also eliminates the difficultly associated with manufacturing a housing for a parallel shaft transmission.

An important feature of the co-axial drive 16 used in the CVT 10 is that the torque reaction and axial reaction between the outboard traction disk pair 22 and 23 take place through the carrier 36 of the co-axial planetary drive 16, while a separate power path is passed through the geared elements of the co-axial planetary 16.

Accordingly, instead of using the illustrated epicyclic planetary (see FIGS. 1 and 3) for the co-axial drive 16, where the output is taken off of the second sun gear 58 from the compounded planet gears 38 and 40, a conventional planetary gear system, with single pinion, double pinion or compounded planet gears, could have been used for the co-axial drive 16, with the output being taken off of its ring gear. A conventional planetary gear system has planet gears revolving around a sun gear and a ring gear around the outside engaging the planet gears. If the output is taken off of a conventional ring gear, different speed characteristics are obtained.

Instead of using a single planetary gear assembly for co-axial drive 16, multiple planetaries could also be used. For example, a first and second planetary gear assembly (not shown) can be used, with each having a sun gear, a planet gear, a planet carrier and a sun gear. In such an alternative assembly for co-axial drive 16, the first sun gear is geared to the inboard disk element 24, and the first carrier is splined to the second outboard disk 23 and the main shaft 18, as described above. In addition, the first carrier and the second ring gear are adapted to rotate with one another, and the first ring gear and the second sun gear are adapted to rotate with one another. The second carrier is then interconnected to the output. In a modification to this alternative co-axial drive, the first ring gear and the second carrier are adapted to rotate with one another, and the second sun gear is interconnected to the output. In another modification of this alternative drive, the first carrier and the second sun gear are adapted to rotate with one another, the first ring gear and the second carrier are adapted to rotate with one another, and the second ring gear is interconnected to the output. In an additional modification to this alternative co-axial drive, the first carrier and the second sun gear are adapted to rotate with one another, the first and second ring gears are adapted to rotate with one another, and the second carrier is interconnected to the output. In a further modification to this alternative co-axial drive, the first and second carriers are adapted to rotate with one another, the first and second ring gears are adapted to rotate with one another, and the second sun gear is interconnected to the output.

Instead of using a planetary gear assembly, a fixed ratio planetary traction drive could be used for the co-axial drive of the present invention. In addition, if a dual cavity toroidal type drive with two separate inboard traction disks is used, the co-axial drive 16 can also be placed between the inboard traction disks and still be driven off of its outboard disks. One embodiment of such an inboard disposed co-axial drive includes a sun gear splined for rotation with the input shaft. The sun gear is enmeshed with one planet gear of a dual pinion pair of meshed planet gears. The other planet gear is enmeshed with a ring gear. The ring gear is adapted for direct rotation with the two separate inboard disks. The two planet gears are supported between two circular flanges of a rotatable planetary carrier. Each of the flanges are splined for rotation with one of two torque tubes, each tube being disposed on either side of the sun gear and concentrically between one of the separate inboard disks and the input shaft. Each tube is also splined for rotation with one of the outboard disks. In a modification of this embodiment, the ring gear can be eliminated by joining the outer radial edges of the separate inboard disks together with a reaction or compression tube, and using three single pinion compound planet gears, one in the center and two on either side, instead of the pair of dual pinion planet gears. The circular flanges of the carrier are positioned one on either side of the center planet gear and inside of the two outside planet gears. A collar extending inboard from each of the two separate inboard disks is splined for rotation with one of the outside planet gears.

Thus, the co-axial drive used in the present invention can comprise many different planetary arrangements and can be disposed at various positions relative to the toroidal drive without departing from the principles of the present invention. Regardless of its structure or location, the present co-axial drive should include a rotating planetary carrier that bisects the axial reaction path between the disks of a single cavity toroidal drive, and that bisects the axial and torque reaction path between one disk pair in the case of a dual cavity toroidal drive. In the dual cavity case, power from one or both of the other disks can be passed through the planetary elements (e.g., the sun gear/planet gear pairs or planet gear/ring gear pairs of a planetary type gear assembly) of the co-axial drive.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A transmission having a power input and output which are co-axial along the same axis of rotation, said transmission comprising:

a dual cavity toroidal drive having two rollers and two pairs of traction disks, a pair of outboard traction disks and a pair of inboard traction disks, with at least one reaction path between the disks in at least one of said pairs of traction disks which does not pass through said rollers; and at least one co-axial drive having a planetary carrier rotating around the axis of rotation and disposed within said at least one reaction path.

2. The transmission of claim 1, wherein the disks of at least one of said pairs of traction disks react at least one of axially and torsionally along said reaction path.

3. The transmission claim 1, wherein said outboard traction disks react axially and torsionally along said reaction path.

4. The transmission claim 1, wherein said co-axial drive has a plurality of elements carried by said carrier, and said elements are operatively adapted to provide a power path between the input and output of said transmission.

5. The transmission of claim 1, wherein said pair of inboard traction disks are integrally formed into a single element.

6. The transmission of claim 1, wherein said transmission further comprises an input shaft for supplying power to said transmission, said toroidal drive is an off-center toroidal drive, at least one of said traction disks is an input disk driven by said input shaft, and at least one other of said traction disks is an output disk connected to said carrier through a torque tube disposed around said input shaft and through at least one of said traction disks.

7. The transmission of claim 1, wherein said at least one co-axial drive is at least one of a conventional planetary gear assembly, an epicyclic planetary gear assembly and a fixed ratio planetary traction drive.

8. A transmission having a co-axial power input and output, said transmission comprising:

two shafts, one of said shafts being an input shaft for supplying power to said transmission and the other of said shafts being an output shaft for transmitting power out from said transmission, each of said shafts having substantially the same axis of rotation;

a dual cavity toroidal drive having two rollers and two pairs of traction disks, a pair of outboard traction disks and a pair of inboard traction disks, with a reaction path between the disks in at least one of said pairs of traction disks which does not pass through said rollers, one disk of one of said pairs of traction disks being mounted for rotation with one shaft of said shafts; and at least one co-axial drive having a planetary assembly with a rotating planetary carrier disposed within said reaction path and being interconnected between said one shaft and said toroidal drive, said toroidal drive and said planetary assembly being operatively adapted for allowing power from said input shaft to travel back and forth through said transmission, between said shafts and along said axis of rotation without the need for parallel shafting.

9. The transmission of claim 8, wherein said toroidal drive and said planetary assembly are operatively adapted for allowing power from said input shaft to be transmitted through said toroidal drive, through a torque tube and to said planetary assembly along the axis of rotation of said input shaft, said torque tube being disposed around said input shaft and through at least one of said traction disks, and for allowing power from said input shaft to be transmitted through said planetary assembly, then through said toroidal drive and back to said input shaft along the axis of rotation of said input shaft.

10. A transmission comprising:
an input shaft for supplying power to said transmission and having an axis of rotation;
a dual cavity toroidal drive having two rollers and two pairs of traction disks, a pair of outboard traction disks and a pair of inboard traction disks, with a reaction path between the disks in at least one of said pairs of traction disks which does not pass through said rollers, one disk of one of said pairs of traction disks being mounted for rotation by said input shaft;
an output; and
a co-axial drive interconnecting said toroidal drive and said output and disposed within said reaction path,
wherein said toroidal drive, said output and said co-axial drive are operatively adapted for allowing power from said input shaft to be transmitted through said one disk of said toroidal drive, through said co-axial drive and to said output along substantially the same axis of rotation as that of said input shaft, and for allowing power from said output to be transmitted through said co-axial drive, through said toroidal drive and back to said input shaft along said axis of rotation, said transmission being thereby capable of exhibiting a recirculatory power loop from and back to said input shaft without the need for parallel shafting.

11. The transmission of claim 10, wherein said co-axial drive includes a planetary carrier, and said outboard traction disks react at least one of axially and torsionally to one another through said carrier.

12. The transmission of claim 10, wherein said reaction path is between said inboard traction disks.

13. The transmission of claim 10, wherein said co-axial drive includes a planetary carrier, one of said outboard traction disks is mounted to rotate with said input shaft, and said carrier is operatively adapted to rotate with said input shaft and the other of said outboard traction disks.

14. The transmission of claim 10, wherein one of the traction disks of one pair is operatively adapted to rotate with said input shaft, said co-axial drive is a planetary gear assembly with a carrier, and said carrier includes a hub mounted to rotate with said input shaft and a support flange mounted to rotate with the other traction disk of said one pair.

15. The transmission of claim 10, wherein two stops are mounted on said input shaft, one of the traction disks of one pair is mounted to rotate with said input shaft, said co-axial drive is a planetary gear assembly with a carrier, said carrier includes a hub mounted to rotate with said input shaft, and said one traction disk and said hub are each seated against one of said stops such that said traction disks and said planetary gear assembly are substantially held axially in position relative to one another.

16. The transmission of claim 10, wherein said co-axial drive is a planetary gear assembly, and said traction disks and said planetary gear assembly are axially held in position so that relative movement therebetween is substantially only rotational in nature.

17. The transmission of claim 10, wherein said co-axial drive is a planetary gear assembly with a carrier, said pair of outboard traction disks react torsionally to one another through said carrier, said pair of inboard traction disks are a single dual-faced inboard traction disk element disposed between said outboard traction disks, said carrier and one of said outboard traction disks are each mounted to rotate around said axis of rotation with said input shaft, the other of said outboard traction disks is operatively adapted to rotate around said axis of rotation with said input shaft through said carrier, and said inboard traction disk element is operatively adapted to rotate around said axis of rotation in an opposite direction to that of said input shaft.

18. The transmission of claim 10, wherein said output is an output gear section which includes a mode one planetary which is a mixing planetary gear assembly with a first planet gear and a mode two planetary which is a speed reducer and reverser planetary gear assembly with a second planet gear, said mode one planetary is operatively adapted so that first planet gear is rotatable by both said input shaft and said co-axial drive, and said mode two planetary is operatively adapted so that said second planet gear is rotatable by said co-axial drive.

19. The transmission of claim 17, wherein said output includes a gear interconnected with an output shaft, said planetary gear assembly includes a compound planet gear mounted on said carrier and connecting one sun gear with another sun gear, said inboard traction disk element is mounted for freely rotating around said input shaft and is connected for rotation with said one sun gear through a torque tube disposed around said input shaft, and said other sun gear is connected for rotation with said gear in said output.

20. The transmission of claim 18 wherein said planetary gear assembly includes a compound planet gear mounted on said carrier and connecting a first sun gear with a second sun gear, said mode one planetary has a third sun gear and said mode two planetary has a fourth sun gear, said third and fourth sun gears are each connected for rotation with said second sun gear through a torque tube and engaged with said first planet gear and said second planet gear, respectively.

* * * * *